(12) United States Patent
Irani et al.

(10) Patent No.: US 9,678,825 B2
(45) Date of Patent: Jun. 13, 2017

(54) AUTONOMOUS RECONFIGURATION OF A FAILED USER ACTION

(71) Applicant: International Business Machines Corporation, Armonk, NY (US)

(72) Inventors: Majid Irani, San Jose, CA (US); Samuel G. Padgett, Raleigh, NC (US); Steven K. Speicher, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 14/182,431

(22) Filed: Feb. 18, 2014

(65) Prior Publication Data

US 2015/0234701 A1 Aug. 20, 2015

(51) Int. Cl.
*G06F 11/00* (2006.01)
*G06F 11/07* (2006.01)
*G06F 11/14* (2006.01)
*G06Q 10/06* (2012.01)

(52) U.S. Cl.
CPC ...... *G06F 11/0793* (2013.01); *G06F 11/0748* (2013.01); *G06F 11/142* (2013.01); *G06Q 10/06* (2013.01)

(58) Field of Classification Search
CPC ............ G06F 11/0745; G06F 11/0793; G06F 11/1402; G06F 11/142; G06F 11/1423; G06F 11/425; G06F 11/1474; G06F 11/1435; G06F 11/2257; G06F 17/30442; G06F 17/30448; G06F 21/30; G06F 21/31; G06F 21/44; G06F 21/45; G06F 21/604; G06F 21/2137
See application file for complete search history.

(56) References Cited

U.S. PATENT DOCUMENTS

| 5,895,471 | A | * | 4/1999 | King | ................. | G06F 17/30884 |
| | | | | | | 707/999.001 |
| 6,029,258 | A | * | 2/2000 | Ahmad | ................. | G06F 11/366 |
| | | | | | | 714/26 |
| 6,490,610 | B1 | | 12/2002 | Rizvi et al. | | |
| 6,769,068 | B1 | * | 7/2004 | Brozowski | .............. | H04L 63/08 |
| | | | | | | 726/1 |
| 2003/0046235 | A1 | * | 3/2003 | Lacivita | ................. | G06Q 20/04 |
| | | | | | | 705/44 |

(Continued)

OTHER PUBLICATIONS

Madgula, et al., "Managing failed flows using the Failed Event Manager API in WebSphere Process Server", Copyright IBM Corporation 2011, Mar. 2, 2011, pp. 1-20, <http://www.ibm.com/developerworks/websphere/tutorials/1103_madgula/index.html>.

(Continued)

*Primary Examiner* — Gabriel Chu
(74) *Attorney, Agent, or Firm* — Isaac J. Gooshaw

(57) ABSTRACT

A processor determines that a requested action is a failed action. The processor determines that the failed action is a valid action. The processor determines that the failed action is not properly configured. The processor generates a reconfigured action by reconfiguring the failed action. The reconfiguration of the failed action includes one or both of a) changing the preconditions of the failed action, or b) creating a recovery path in addition to the failed action.

18 Claims, 5 Drawing Sheets

(56) References Cited

U.S. PATENT DOCUMENTS

| | | | |
|---|---|---|---|
| 2004/0225381 A1* | 11/2004 | Ritz | G06F 11/0709 700/26 |
| 2005/0154740 A1* | 7/2005 | day | G06F 17/30595 707/999.1 |
| 2005/0177557 A1* | 8/2005 | Ziauddin | G06F 17/30306 707/999.003 |
| 2006/0026227 A1* | 2/2006 | Shaughnessy | G06F 11/0709 709/202 |
| 2009/0043745 A1* | 2/2009 | Barsness | G06F 17/30471 707/999.004 |
| 2009/0089865 A1* | 4/2009 | Baron | G06F 21/6209 726/6 |
| 2009/0094192 A1* | 4/2009 | Bestgen | G06F 17/30474 707/999.002 |
| 2010/0107231 A1* | 4/2010 | Kavanagh | H04L 9/3213 726/7 |
| 2010/0199121 A1* | 8/2010 | Abts | G06F 11/0724 714/2 |
| 2010/0312776 A1* | 12/2010 | Burrichter | G06F 17/30395 707/759 |
| 2012/0144234 A1* | 6/2012 | Clark | G06F 11/0727 714/16 |

OTHER PUBLICATIONS

"Resubmitting failed events in WebSphere ESB", provided in the main idea by inventor on Nov. 1, 2013, http://pic.dhe.ibm.com/infocenter/esbsoa/wesbv7r5/topic/com.ibm.websphere.wesb.administering.doc/topics/cadm_resubmitting.html>.

* cited by examiner

AUTONOMOUS RECONFIGURATION OF A FAILED USER ACTION

BACKGROUND OF THE INVENTION

The present invention relates generally to the field of error resolution, and more particularly for autonomous reconfiguration of a failed user action.

In a networked environment, numerous users, through client applications, request actions to be performed by a server. When the actions fail to be performed, it can be important to resolve the errors causing the failure as quickly and seamlessly as possible. The promptness of the resolution can help users continue their work with little downtime, while the transparency may allow the users to focus on their work without concerning themselves with issues related to the network. The types of actions a user can request of a networked computing system have grown as the systems themselves have become more complex. This growth has influenced the way in which error resolution is implemented.

SUMMARY

Embodiments of the present invention provide a system, method and program product for reconfiguring of a failed action. A processor determines that a requested action is a failed action. The processor determines that the failed action is a valid action. The processor determines that the failed action is not properly configured. The processor generates a reconfigured action by reconfiguring the failed action, wherein the reconfiguration of the failed action includes one or both of a) changing the preconditions of the failed action, or b) creating a recovery path in addition to the failed action.

DETAILED DESCRIPTION

In known solutions, numerous users request actions to be performed by a server, via client applications, in a networked environment. The server determines whether the requested action is valid at the time of the request. If the action is determined to be invalid, for whatever reason, the server will deny the request and supply an error message to the user of the client application. In response to receiving the error message, the user must determine what caused the error and contact the system administrator of the network to resolve the issue, which requires valuable time and effort by the user.

Embodiments of the present disclosure recognize that it would be advantageous to automate the process of resolving the errors a user may encounter when performing actions on a network. Further recognized is that it would be desirable to resolve a requested action of the user without any further action required by the user until the error generated by the request is resolved.

The present disclosure will now be described in detail with reference to the Figures.

Figure 1:
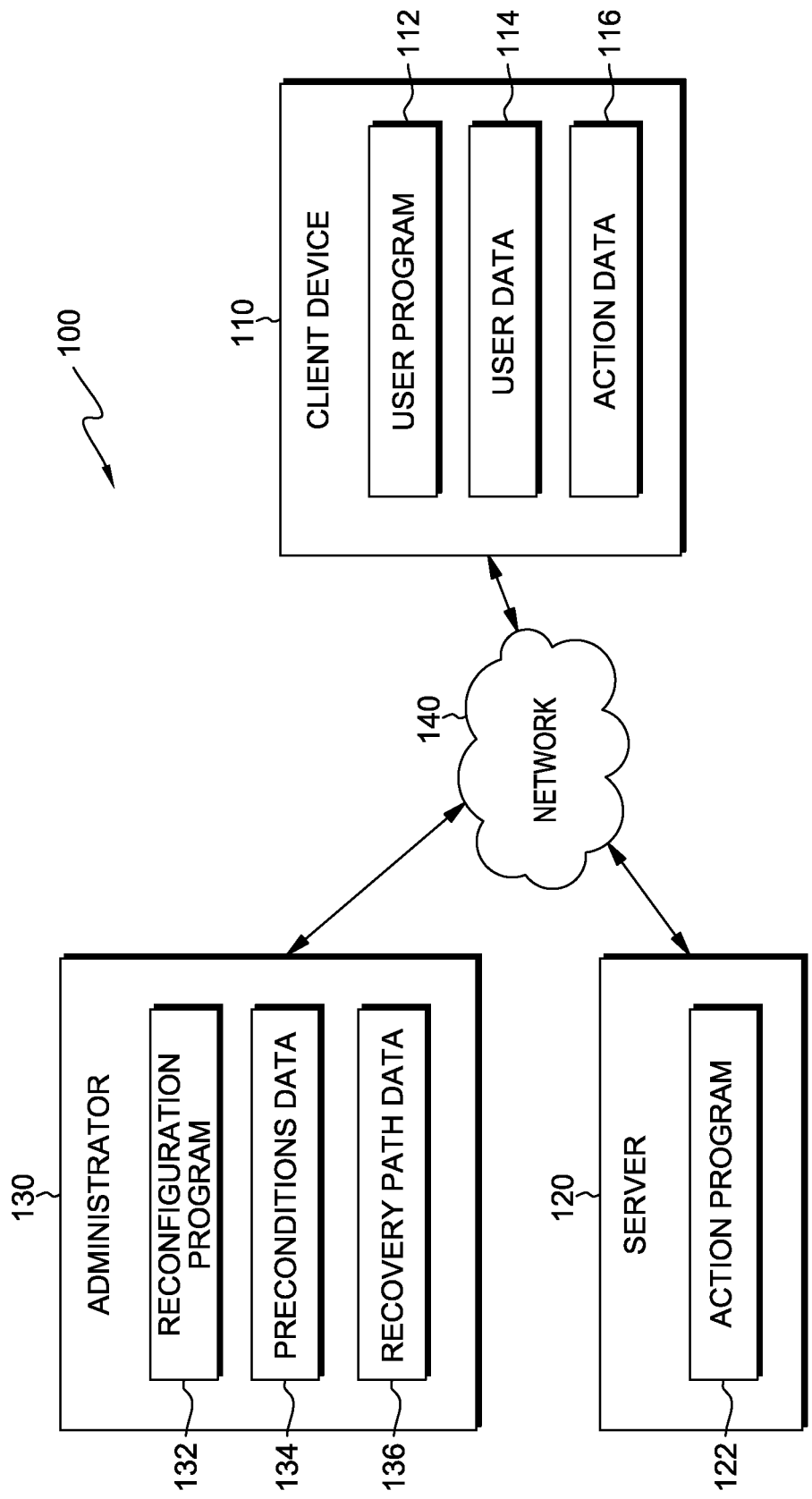
FIG. 1 is a functional block diagram illustrating a networked environment, in accordance with an exemplary embodiment of the present invention.

FIG. 1 is a functional block diagram illustrating a networked environment, generally designated 100, in accordance with one embodiment of the present disclosure.

Networked environment 100 includes client device 110, server 120 and administrator 130 that are connected via network 140. Client device 110 respectively includes user program 112, user data 114 and action data 116. Server 120 includes action program 122. Administrator 130 includes reconfiguration program 132, preconditions data 134 and recovery path data 136.

In various embodiments of the present disclosure, client device 110, server 120 and administrator 130 are computing devices that can respectively be standalone devices, servers, laptop computers, tablet computers, netbook computers, personal computers (PC), or desktop computers. In another embodiment client device 110, server 120 and administrator 130 represent computing systems utilizing clustered computers and components to act as a single pool of seamless resources. In general, client device 110 can be any computing device or a combination of devices with access to user program 112, user data 114 and action data 116, and are capable of requesting, receiving and passing information to and from server 120 and administrator 130. Client device 110 can also be any computing device or a combination of devices with access to, and is capable of executing, reconfiguration program 132. Server 120 can be any computing device or a combination of devices with access to and is capable of executing action program 122. Administrator 130 can be any computing device or a combination of devices with access to reconfiguration program 132, preconditions data 134 and recovery path data 136 and is capable of executing reconfiguration program 132. Client device 110, server 120 and administrator 130 may include internal and external hardware components, as depicted and described in further detail with respect to FIG. 5.

In this exemplary embodiment, user program 112, user data 114 and action data 116 are stored on client device 110, while action program 122 is stored on server 120. Furthermore, in this exemplary embodiment, reconfiguration program 132, preconditions data 134 and recovery path data 136 are stored on administrator 130. However, in other embodiments, user program 112, user data 114, action data 116, action program 122, reconfiguration program 132, preconditions data 134 and recovery path data 136 may be stored externally and accessed through a communication network, such as network 140. Network 140 can be, for example, a local area network (LAN), a wide area network (WAN) such as the Internet, or a combination of the two, and may include wired, wireless, fiber optic or any other connection known in the art. In general, network 140 can be any combination of connections and protocols that will support communications between client device 110, server 120, administrator 130, user program 112, user data 114, action data 116, action program 122, reconfiguration program 132, preconditions data 134 and recovery path data 136 in accordance with a desired embodiment of the present invention.

In exemplary embodiments, user program 112 of client device 110 sends user data 114 to action program 122 of server 120. Action program 122 uses the information included in user data 114 to determine a degree of user authorization to access action program 122. User data 114 may include credentials of users (e.g. username and password) to authorize use of action program 122 as well as membership to group authorized to access action program 122. Client device 110 also sends action data 116 to action program 122, which includes a requested action to be performed by action program 122. Action program 122 executes the requested action that is part of action data 116. Based on the execution of the requested action, action program 122 generates a response to action data 116 that is based on a degree of successful execution of the requested action. If action program 122 cannot execute the requested action, then action program 122 generates an error message detailing the reason why the requested action could not be executed and updates action data 116 with the error message. A requested action that fails to be executed is herein denoted as a failed action. In some embodiments, a threshold is used to determine the degree of completion a request must achieve in order to be considered successfully completed. Action program 122 sends action data 116, including the error message, to reconfiguration program 132 of administrator 130 without any further action required by the user of client device 110.

In other embodiments, responsive to receiving updated information included as part of action data 116, user program 112 displays the error message for the user. User program 112 receives acknowledgement by the user concerning the occurrence of the error message. In response to receiving the acknowledgement, user program 112 sends action data 116, including the error message, to reconfiguration program 132 of administrator 130.

In exemplary embodiments, reconfiguration program 132 of administrator 130 receives action data 116 from action program 122. Action data 116 includes the requested action and the error message generated by action program 122. Reconfiguration program 132 determines, based on the requested action, included as part of the received action data 116, if the requested action is a valid action that action program 122 is capable of performing. If the requested action is not a valid action, i.e. cannot be performed by action program 122, then action data 116 is updated by reconfiguration program 132 to reflect that the action cannot be performed as requested. Reconfiguration program 132 sends user program 112 a message indicating that the requested action is not a valid operation of action program 132 and could not be performed. In general, if reconfiguration program 132 determines that the requested action is a valid action of action program 122, then reconfiguration program 132 proceeds to reconfigure action data 116 such that the resulting reconfigured action can be executed without subsequent generation of the same error that resulted from the attempted execution of the requested action.

Typically, reconfiguration program 132 determines, based on the updated information included as part of action data 116, if the requested action can be reconfigured to resolve the error message generated by action program 122. If reconfiguration program 132 determines that the requested action cannot be automatically reconfigured, then reconfiguration program 132 sends user program 112 a message indicating that the action cannot be performed. If reconfiguration program 132 determines that the requested action can be automatically reconfigured, then reconfiguration program 132 compares the requested action to preconditions data 134 for a given type of action, i.e., the requested action of action data 116. In general, preconditions data 134 includes information that allows for the execution of requested actions that could not be executed. Reconfiguration program 132 determines what preconditions need to be satisfied for a requested action to execute without subsequent generation of the same error that resulted from the attempted execution of the requested action. In this embodiment, reconfiguration program 132 bases such a determination on the differences between preconditions data 134 and action data 116. Once determined, action data 116 is updated to include known configurations of the requested action, which are stored in preconditions data 134, such that action data 116 can be executed without subsequent generation of the same error that resulted from the attempted execution of the requested action.

As a non-limiting example, user program 112 requests an action to be performed by action program 122. The requested action is incomplete and omits a portion of the action necessary for action data 116 to execute without receiving the error message generated by action program 122. Preconditions data 134 includes known configurations required for a given action to execute without generating the error, such as arguments to a command-line interface or dialog options, and the dialog's respective object values, in a graphical user interface or GUI. Reconfiguration program 132 reconfigures action data 116 to include the proper configuration as indicated by preconditions data 134.

In this exemplary embodiment, reconfiguration program 132 also reconfigures the requested action using recovery path data 136. Recovery path data 136 includes additional actions that can be included as part of action data 116 such that action data 116 will execute without generating the error indicated by action program 122. The actions contained in recovery path data 136 are not part of action data 116 as originally requested by the user, but are determined to be included in addition to the requested action stored in action data 116 in order to execute without generating the error indicated by action program 122. Reconfiguration program 132 updates action data 116 with the reconfigured action, which includes the actions indicated by recovery path data 136, in order for the requested action to be executed without subsequent generation of the same error that resulted from the attempted execution of the requested action by action program 122.

In other embodiments recovery path data 136 includes actions that not only alter action data 116 and user data 114, but also alter the configurations of other programs and data located on network 140. As a non-limiting example, a user of client device 110 requests an action to be performed by action program 122 of server 120. Network 140 consists of multiple database servers, and the user of client device 110 has requested to link records that are stored across two different servers. Action program 122 is unable to establish a link to the requested records due to one of the records residing on another server of network 140. The link of records cannot be established due to the two database servers not having the correct relationship such that the two database servers are able to link records stored on one another. Recovery path data 136 includes the required actions to establish a relationship between database servers, thereby providing access to the records requested by the user in the requested action. Action data 116 is reconfigured by reconfiguration program 132 to perform the required actions as indicated by recovery path data 136, in addition to the requested action made by the user.

In other embodiments, reconfiguration program 132 reconfigures action data 116 with preconditions data 134 alone or in combination with recovery path data 136. In other embodiments reconfiguration program 132 reconfigures action data 116 with recovery path data 136 alone or in combination with preconditions data 134. If reconfiguration program 132 determines that action data 116 can be automatically reconfigured, then reconfiguration program 132 determines the appropriate solution based on one or more of preconditions data 134 or recovery path data 136.

In the exemplary embodiment, the updated action data 116 and user data 114 are automatically sent by reconfiguration program 132 to action program 122 of server 120, which executes the reconfigured action using the credentials of the user. By executing the action on behalf of the user, action program 122 is able to maintain a log indicating the user who originated the request; thereby making the reconfiguration by reconfiguration program 132 transparent to the user. Upon execution of the reconfiguration request, server 120 sends a message indicating successful execution to client device 110.

Furthermore, recovery path data 136 includes actions that can reconfigure user data 114 to grant proper authorization, either temporarily or permanently, such that the user is granted authorization to perform the action given the authorization is not granted already. As a non-limiting example, a permanent authorization is granted when a user is determined to have improper authorization to a file but is a member of the group associated with the file. As another non-limiting example, the decision to grant authorization to a user on a temporary basis may be determined by the duration that a requested action will take to complete. As a non-limiting example, a user requests to check out a file in a document management system. Reconfiguration program 132 includes additional action to action data 116 that grant the user temporary authorization to the file, where said authorization will be revoked once the file has been checked back in by the user. In other embodiments, recovery path data 136 indicates that other programs or devices require authorization to perform certain actions. In this instance, authorization may be granted on a temporary or permanent basis. As a non-limiting example, action program 122 does not have administrative authorization to access a service of server 120. Reconfiguration program 132 will grant temporary authorization to this service and will revoke the authorization after the execution of the reconfigured action, as indicated by recovery path data 136.

In the exemplary embodiment, the user has access to multiple client devices of network 140, e.g. client device 110 or other client devices (not shown). During the operation of reconfiguration program 132, the user logs onto a different client device of network 140 as opposed to client device 110 where the requested action originated. User data 114 identifies the user and associates a current client device that the user is utilizing. In response to a successful execution of a reconfigured action, action program 122 of server 120 sends a message indicating successful execution of the reconfigured action to the user's current client device. In other embodiments, the user is not utilizing any device of network 140 when successful completion of the reconfigured action occurs. In this embodiment, a message indicating successful execution will be provided when the user accesses network 140 on a client device, e.g. client device 110 or other client devices of network 140, upon a log in using the user's credentials of user data 114.

In some embodiments, if reconfiguration program 132 is unable to determine a recovery path or a set of preconditions that will allow a requested action to execute without generating the same error message generated by action program 122, then reconfiguration program 132 creates a ticket for an error resolution program connected to network 140 to process. The ticket includes user data 114 and action data 116 and any relevant precondition data 134 and recovery path data 136 as determined by reconfiguration program 132. Once the ticket is resolved, the error resolution program updates preconditions data 134 or recovery path data 136, such that reconfiguration program 132 has the capability to automatically resolve later requested actions of a similar nature.

The error resolution program is capable of taking the submitted ticket (containing user data 114 and action data 116, and any relevant precondition data 134 and recovery path data 136) and identifying previously unknown preconditions and recovery paths needed for automatically reconfigured action data 116. The error resolution program is capable of searching numerous sources of data, e.g. local and remote databases as well as web sites, which contain solutions to the errors contained within the ticket. Based on the search, the error resolution program will determine a correct solution. Using the determined solution, the error resolution program will update the information contained within the ticket such that the requested action can be executed without subsequent generation of the same error that resulted from the attempted execution of the requested action. Also, the error resolution program will update one or both of preconditions data 134 or recovery path data 136, such that, when reconfiguration program 132 encounters a similar failed action, reconfiguration program 132 will reconfigure action data 116 as determined by the error resolution program.

In other embodiments, the requested action is made to a local program (not pictured) executing on client device 110. The requested action fails and action data 116 is generated including the requested action and error messages generated by the local program and passed along to reconfiguration program 132 of administrator 130. Reconfiguration program 132 receives action data 116 and determines if action data 116 can be automatically reconfigured as disclosed above. Once action data 116 is automatically reconfigured, action data 116 is sent to user program 112 in order to execute the reconfigured action data 116.

In other embodiments, reconfiguration program 132 is a program that is stored locally on client device 110, as well as preconditions data 134 and recovery path data 136. In this embodiment, action data 116 is passed to reconfiguration program 132 and the reconfiguration of action data 116 occurs on client device 110. As a non-limiting example, the user has 'guest' authorization when requesting actions using user program 112 of client device 110. Reconfiguration program 132 has 'administrator' or 'root' authorization of client device 110. Reconfiguration program 132 reconfigures action data 116 by temporally granting user data authorization to perform requests that require 'administrator' privileges, e.g. privileges for installing new programs.

As a non-limiting example of the above disclosure, server 120 includes a document management system as action program 122. A user accesses client device 110 using user data 114, which includes a username, password and group membership. The user makes a requested action to user program 112 to check out a file in order make changes to the current copy being stored by the document management system. This requested action is stored as action data 116 and sent to action program 122 of server 120. Action program 122 determines that the user does not have the proper credentials to access the requested file, utilizing the information stored in user data 114, i.e. improper group membership authorization. As a result, action program 122 returns an error message indicating that the proper group membership does not exist for the user and the action has failed, and action data 116 is updated accordingly with the failed action.

In this example, action program 122 sends action data 116 to reconfiguration program 132. Reconfiguration program 132 determines that the action of checking out a file is a valid action of action program 122 (document management system) and will proceed with processing. Reconfiguration program 132 compares action data 116 to a preconditions data 134 entry for 'checking out a file' action and determines that action data 116 includes a correct set of preconditions that are configured properly, i.e. the requested action has the correct options and commands configured.

In this example, reconfiguration program 132 compares action data 116 to recovery path data 136 to determine if performing additional actions will resolve the error. In this case, reconfiguration program 132 determines that the recovery path for not being a member to a group has a known recovery path. Reconfiguration program 132 uses recovery path data 136 to reconfigure action data 116 by adding the user to the group prior to performing the checking out action as originally requested. Reconfiguration program 132 reconfigures action data 116 and other programs and data located on network 140 such that action data 116 can be executed without subsequent generation of the same error message generated by action program 122.

In this particular non-limiting example, recovery path data 136 indicates that action program 122 must add user data 114 to the group membership associated with the file requested to be checked out. Reconfiguration program 132 reconfigures the failed action, using changes determined by precondition data 134 and recovery path data 136, such that action data 116 will execute without error, thus performing the action requested by the user without subsequent generation of the same error that resulted from the attempted execution of the requested action.

Figure 2:
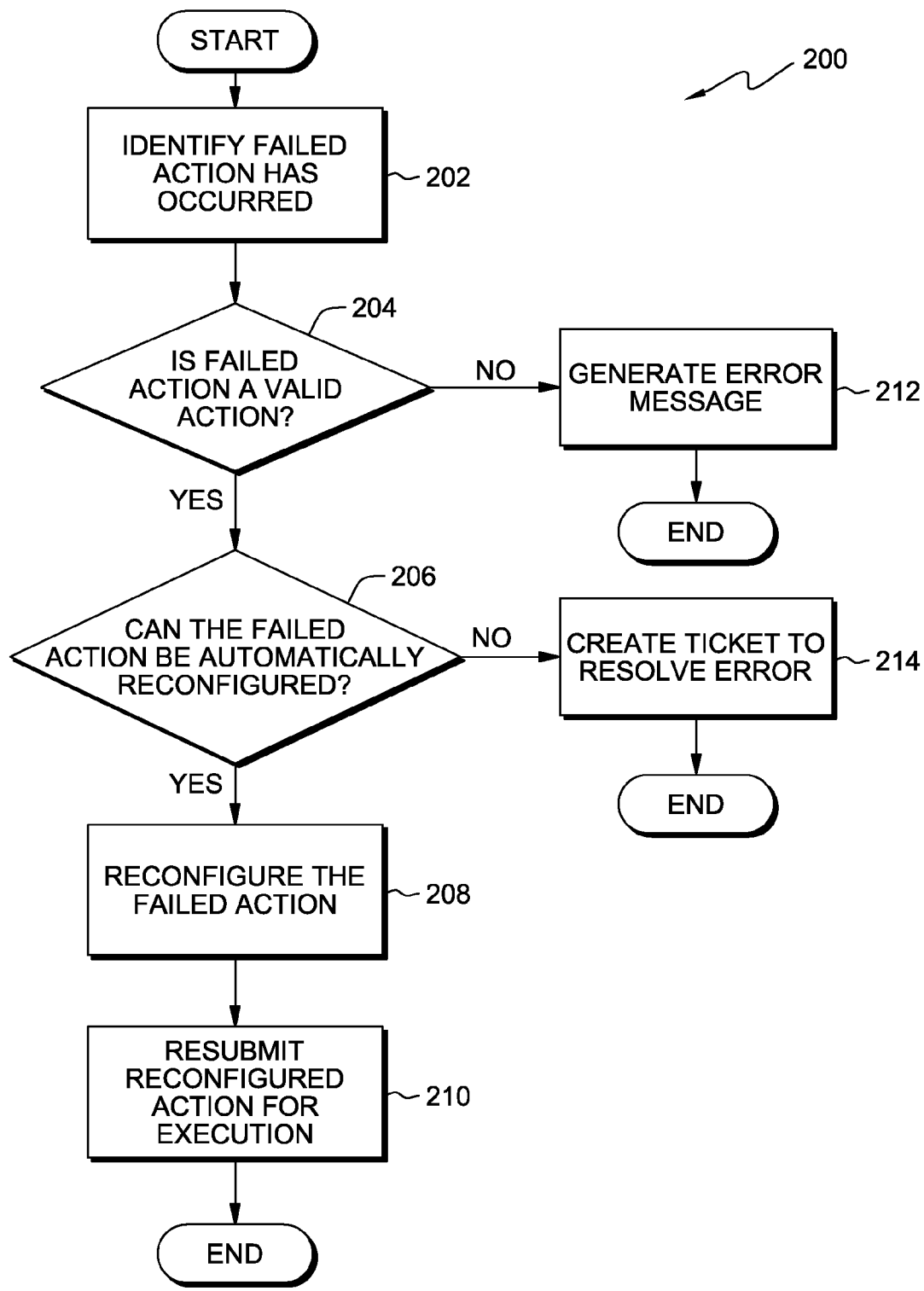
FIG. 2 illustrates operational process of a reconfiguration program, on an administrator within the networked environment of FIG. 1, in accordance with an exemplary embodiment of the present invention.

FIG. 2, is a flowchart, 200, illustrating the operational process of reconfiguration program 132 executing on administrator 130, in accordance with an exemplary embodiment.

In process 202, reconfiguration program 132 of administrator 130 identifies a failed action from received action data 116 sent by action program 122. In decision process 204, reconfiguration program 132 determines if action data 116 is a valid action to be performed by action program 122 of server 120. If action data 116 is not a valid action that can be performed by action program 122 of server 120 (decision process 204, NO branch), then reconfiguration program 132 proceeds to process 212 where action data 116 is updated with an error message and processing ends. However, if recommendation program 132 determines action data 116 to be a valid action (decision process 204, YES branch) then reconfiguration program 132 proceeds to decision process 206.

In decision process 206, reconfiguration program 132 determines if the failed action contained in action data 116 can be automatically reconfigured. The determination is made based on a comparison between the failed action and one or more of preconditions data 134 or recovery path data 136; discussed in further detail with regard to FIGS. 3 and 4 below for using precondition data 134 and recovery path data 136, respectively. If reconfiguration program 132 is unable to reconfigure action data 116 by data found in precondition data 134 or recovery path data 136 (decision process 206, NO branch), then reconfiguration program 132 proceeds to process 214 where reconfiguration program 132 creates a ticket. The ticket includes action data 116, user data 114 and relevant precondition data 134 and recovery path data 136 that could not automatically be reconfigured. The ticket is submitted for review to an error resolution program. If action data 116 can be automatically reconfigured (decision process 206, YES branch), then reconfiguration program 132 will proceed to process 208 to reconfigure the failed action, included in action data 116, using one or more of precondition data 134 or recovery path data 136.

In an exemplary embodiment, reconfiguration program 132 will reconfigure the arguments or options associated with action data 116, i.e. arguments in a command line environment or options chosen in a GUI, as indicated by preconditions data 134. Reconfiguration program 132 will also reconfigure action data 116 by performing additional actions that will allow for execution of the failed action to be executed without subsequent generation of the same error resulted from the attempted execution of the requested action as indicated by recovery path data 136. In regards to process 206, both the reconfiguration based on preconditions data 134 and recovery path data 136 are discussed in more detail in FIG. 3 and FIG. 4, respectively. Once reconfiguration program 132 has performed the necessary actions to reconfigure action data 116 as indicated by recovery path data 136, reconfiguration program 132 then precedes to process 210. In other embodiments recovery path data 136 is used either alone or in combination with preconditions data 134.

In other embodiments, recovery path data 136 will also store actions to reconfigure one or more of the following: user data 114, action program 122, server 120, other programs executed on the servers of network 140, other servers connected to network 140, or network 140. For example, recovery path data 136 may include actions to alter user data 114 if error messages are generated that indicate improper authorization to access a file. In this case, recovery path data would include action to reconfigure user data 114 to add the user to a group with authorization to access the file.

Regarding reconfiguring action program 122 and other programs of network 140, recovery path data 136 may include actions to configure the programs to perform actions that are not part of the requested action in action data 116. For example, action program 122 may need to perform an action, but does not possess the functionality to perform the operation. Another program located on the network can perform the action. Recovery path data 136 will include additional actions to configure action program 122 to make the request to the other program such that action program 122 will execute the requested action by way of other programs located on network 140.

Regarding reconfiguring server 120 and other servers of the network 140, recovery path data 136 may include actions to change configurations of a server. For example, a request times out due to resources not being available for a given amount of time. In this case, recovery path data 136 would include actions to increase the time out value of the server such that the action would be able to execute when resources become available at a later time.

Regarding the reconfiguration of network 140, a request may generate an error message stating that action program 122 of server 120 is not be able to communicate with another program located on a different server of network 140. Reconfiguration program 132 may determine that the routing table of a router in network 140 does not contain an entry to permit communication between server 120 and the other server due to both servers being located on different subnets. Reconfiguration program 132 will include recovery path data 136 to update the router's routing table to allow communication between the subnets. This determination is based on a known network topology and trace routes performed by server 120 to determine where to failure to connect the networks is occurring.

In an exemplary embodiment, reconfiguration program 132 proceeds with process 210, where the reconfigured action data 116 is executed on behalf of the user. Reconfiguration program 132 executes action data 116 on behalf of the user by using user data 114, without any further action required by the user. The user is notified of the action being executed without subsequent generation of the same error that resulted from the attempted execution of the requested action by action program 122.

Figure 3:
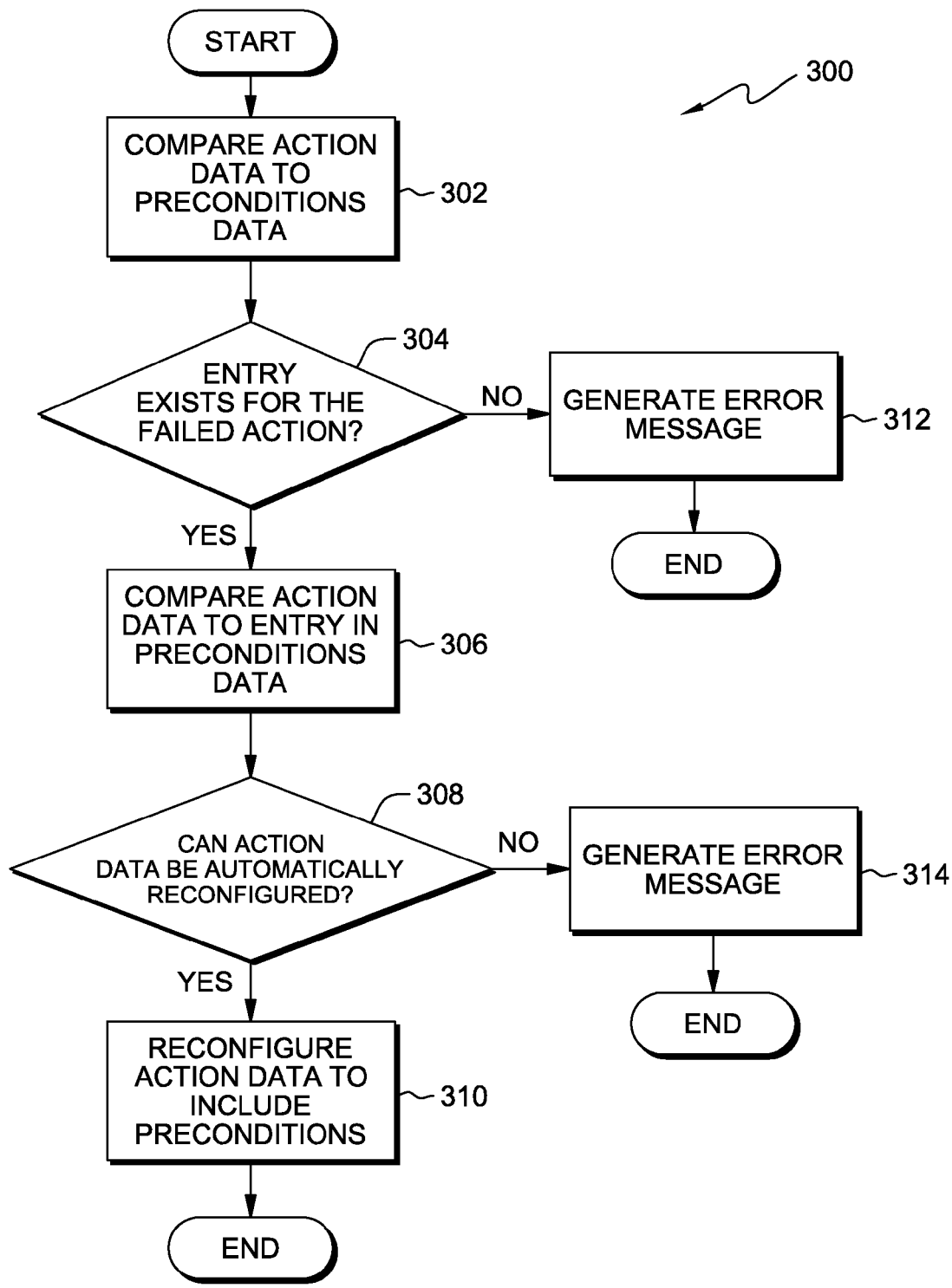
FIG. 3 illustrates operational process performed by the reconfiguration program to apply preconditions data.

FIG. 3, is a flow chart, 300, illustrating the operational process of reconfiguration program 132 executing on administrator 130 further illustrating the reconfiguring action data 116 by way of preconditions data 134, in accordance with an exemplary embodiment.

In process 302, reconfiguration program 132 compares action data 116 to preconditions data 134. Reconfiguration program 132 determines if an entry exists in preconditions data 134 for the failed action of action data 116 in decision process 304, based on the comparison made in process 302. If no entry exists in preconditions data 134 for the failed action of action data 116 (decision process 304, NO branch), then reconfiguration program 132 will generate an error message that the preconditions of action data 116 could not be reconfigured due to an entry not being found, as shown in process 312. In exemplary embodiments, reconfiguration program 132 will proceed to determine if recovery path data 136 exists for the failed action, as discussed in the above disclosure and FIG. 4 below, given the determination has not been made yet. In other embodiments, reconfiguration program 132 updates action data 116 with the error message generated above in process 312. The updated action data 116 is used to create a ticket that is sent to the error resolution program for reconfiguration as disclosed in process 214 of FIG. 2.

If reconfiguration program 132 determines an entry exists for the failed action in preconditions data 134 (decision process 304, YES branch), then reconfiguration program 132 proceeds to process 306 and compares action data 116 to the entries of preconditions data 134 associated with the failed action determined in process 302. In decision process 308, reconfiguration program 132 determines if the action data can be automatically reconfigured using preconditions. In this embodiment, such a determination is based on whether the preconditions, included in preconditions data 134, can be applied to the failed action of action data 116, e.g. preconditions data 134 has an entry for a failed action that includes an argument that is not part of action data 116.

If reconfiguration program 132 determines that the action data cannot be automatically reconfigured using preconditions, e.g. reconfiguration program 132 could not apply preconditions data 114 associated with the failed action to action data 116, (decision process 308, NO branch), then reconfiguration program 132 proceeds to process 314. In process 314, reconfiguration program 132 generates a message stating that the preconditions could not be reconfigured and reconfiguration program 132 updates action data 116 with the generated message. In exemplary embodiments, reconfiguration program 132 will proceed to determine if recovery path data 136 exists for the failed action, as discussed in the above disclosure and FIG. 4 below. In other embodiments, reconfiguration program 132 updates action data 116 with the error message generated above in process 314. The reconfiguration program 132 creates a ticket with updated action data 116 that is sent to the error resolution program for reconfiguration as disclosed in process 214 of FIG. 2.

If reconfiguration program 132 determines that the action data can be automatically reconfigured using preconditions, e.g. reconfiguration program 132 determines that the preconditions of action data 116 can be automatically reconfigured, (decision process 308, YES branch), then reconfiguration program 132 proceeds to process 310. In process 310, reconfiguration program 132 reconfigures the arguments of the failed action and updates action data 116 according to the determined preconditions data 134. In the exemplary embodiment, reconfiguration program 132 will determine if any applicable recovery path data 136 is available as disclosed in FIG. 4 below. In other embodiments, reconfiguration program 132 does not reconfigure action data 116 based on recovery path data 136. As such, reconfiguration program 132 resubmits action data 116 as disclosed in process 210 of FIG. 2 above with the determined preconditions data 134 included in action data 116.

Figure 4:
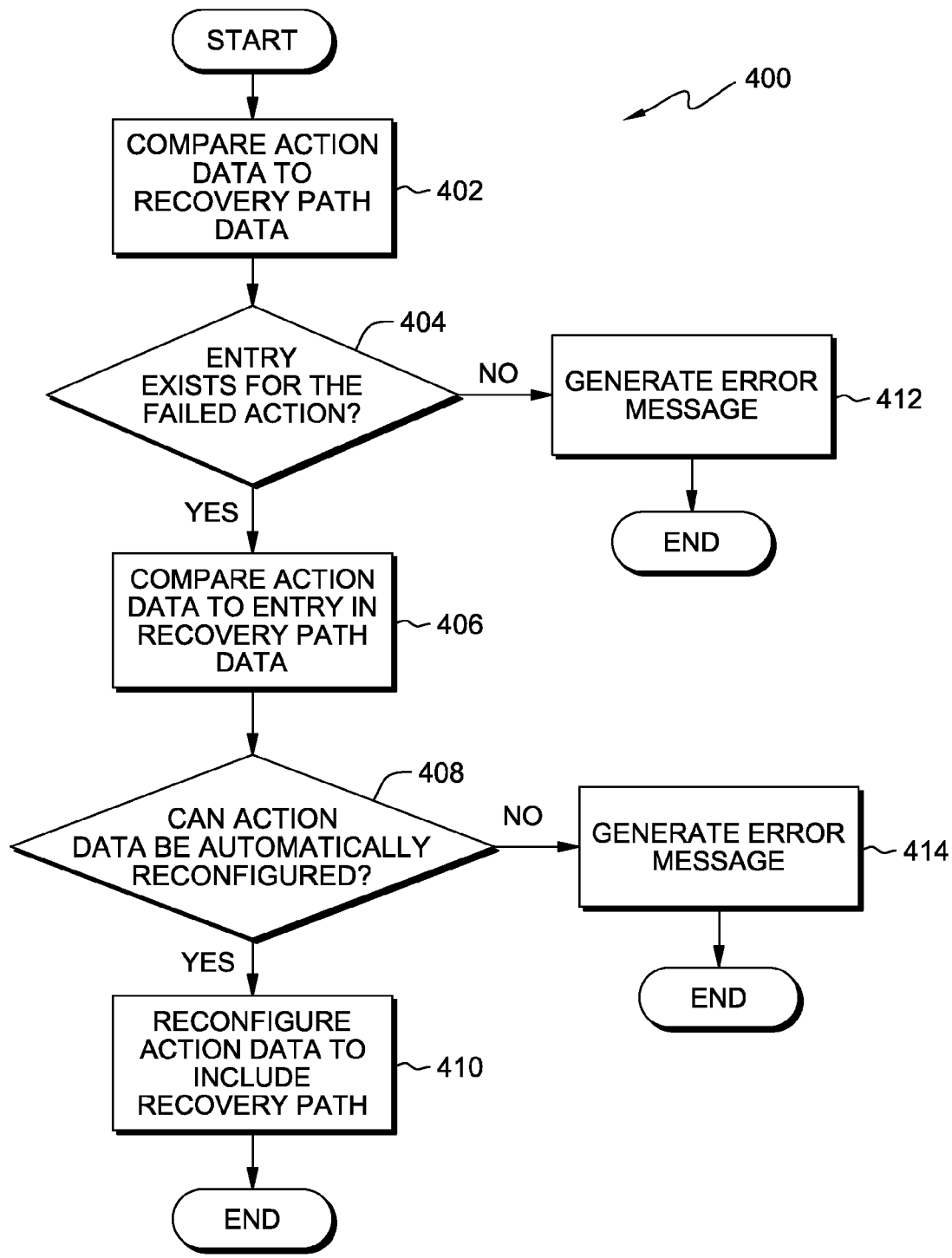
FIG. 4 illustrates operational process performed by the reconfiguration program to apply recovery path data.

FIG. 4, is a flow chart, 400, illustrating the operational process of reconfiguration program 132 executing on administrator 130 further illustrating the reconfiguring action data 116 by way of recovery path data 134, in accordance with an exemplary embodiment.

In process 402, reconfiguration program 132 compares action data 116 to recovery path data 136, based on the comparison made in process 302. Reconfiguration program 132 determines if an entry exists in recovery path data 136 for the failed action of action data 116. If no entry exists in recovery path data 136 for the failed action of action data 116 (decision process 404, NO branch), then reconfiguration program 132 will generate an error message that action data 116 could not be reconfigured due to an entry not being found in recovery path data 136, as shown in process 412. In exemplary embodiments, reconfiguration program 132 will proceed to determine if applicable preconditions data 134 exists for the failed action, as discussed in the above disclosure of FIG. 3, given the determination has not been made yet. In other embodiments, reconfiguration program 132 updates action data 116 with the error message generated above in process 412. The reconfiguration program 132 creates a ticket including updated action data 116 that is sent to the error resolution program system for reconfiguration as disclosed in process 214 of FIG. 2.

If reconfiguration program 132 determines an entry exists for the failed action in recovery path data 136 (decision process 404, YES branch), then reconfiguration program 132 compares action data 116 to the entries of recovery path data 136 associated with the failed action determined in process 406. In decision process 408, reconfiguration program 132 determines if the action data can be automatically reconfigured using a recovery path entry. In this embodiment, such a determination is based on whether the entry in recovery path data 136 can be applied to the failed action of action data 116, e.g. recovery path data 136 has actions to be performed prior to and/or after the execution of failed action such that the action as requested is executed without generating the error message determined by action program 122.

If reconfiguration program 132 determines that the action data cannot be automatically reconfigured using a recovery path entry, e.g., reconfiguration program 132 could not apply recovery path data 136 associated with the failed action to action data 116, (decision process 408, NO branch), then reconfiguration program 132 proceeds to process 414. In process 414, reconfiguration program 132 generates an error message stating that the recovery path could not be determined and reconfiguration program 132 updates action data 116 with the message. In exemplary embodiments, reconfiguration program 132 will proceed to determine if preconditions data 134 exists for the failed action, given the operation has not been performed. In other embodiments, reconfiguration program 132 updates action data 116 with the error message generated above in process 414. The updated action data 116 is used to create a ticket that is sent to the error resolution program for reconfiguration as disclosed in process 214 of FIG. 2.

If reconfiguration program 132 determines that the action data can be automatically reconfigured using a recovery path entry, e.g., reconfiguration program 132 could apply recovery path data 136 associated with the failed action to action data, 116 (decision process 408, YES branch), then reconfiguration program 132 proceeds to process 410. In process 410, reconfiguration program 132 reconfigures action data 116 to include the recovery path data, which includes additional actions needed to be performed such that the original requested action is executed without generating the error message generated by action program 122. In the exemplary embodiment, reconfiguration program 132 will determine if any applicable preconditions data 134 is available as disclosed in FIG. 3 above. If preconditions data 134 has already been applied by reconfiguration program 132, reconfiguration program 132 resubmits action data 116 as disclosed in process 210 of FIG. 2. In other embodiments, preconditions data 134 is not applied. In such an embodiment, only recovery path data 136 is used to reconfigure action data 116. In which case, reconfiguration program 132 resubmits action data 116 for execution as disclosed in process 210 of FIG. 2.

Figure 5:
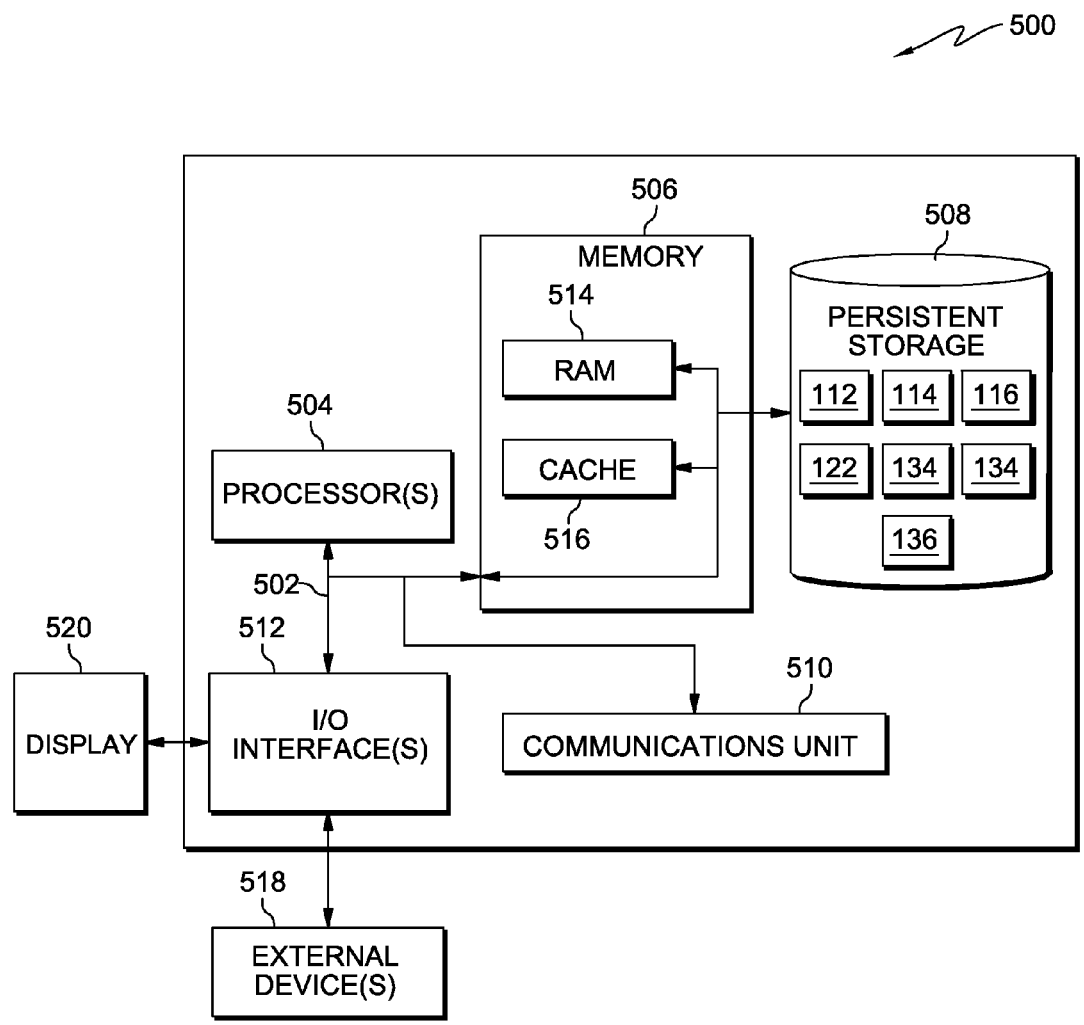
FIG. 5 depicts a block diagram of components of the computing device executing the provenance generating program, in accordance with an exemplary embodiment of the present invention.

FIG. 5 depicts a block diagram, 500, of respective components of client device 110, server 120, and administrator 130, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Client device 110, server 120, and administrator 130 include respective communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

User program 112, action program 122 and reconfiguration program 132 are respectively stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 140. In these examples, communications unit 510 includes one or more network interface cards. Communications unit 510 may provide communications through the use of either or both physical and wireless communications links. User program 112, action program 122 and reconfiguration program 132 may respectively be downloaded to persistent storage 508 through communications unit 510.

I/O interface(s) 512 allows for input and output of data with other devices that may be connected to client device 110, server 120, and administrator 130 respectively. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., user program 112, action program 122 and reconfiguration program 132 can respectively be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method for reconfiguring a requested action, the method comprising:
   determining, by one or more processors, that a requested action is a first failed action wherein the requested action is initiated by a user of a first device;
   determining, by the one or more processors, that the first failed action is a valid action;
   determining, by the one or more processors, that the first failed action is not properly configured;
   initiating, by the one or more processors, a generation of a partially reconfigured action, wherein the partially reconfigured action includes one or both of the following: a) one or more relevant preconditions of the first failed action, and b) a relevant recovery path for the first failed action;

responsive to a determination that the generation of the partially reconfigured action of the first failed action has failed, submitting, by the one or more processors, the requested action and the partially reconfigured action to an error resolution program;

receiving, by the one or more processors, a reconfigured action from the error resolution program, wherein (i) the reconfigured action includes one or both of the following: a) a different one or more preconditions than the partially reconfigured action, and b) a different recovery path than the partially reconfigured action; and (ii) the reconfigured action is generated based, at least in part, on one or more results from a search of at least one remote database;

executing, by the one or more processors, the reconfigured action, wherein the reconfigured action is executed when the user is currently not utilizing the first device;

in response to a determination that the user is utilizing a second device, sending, by the one or more processors, a message indicating the execution of the reconfigured action; and reconfiguring, by the one or more processors, a second failed action based, at least in part, on one or both of the following: a) the received different one or more preconditions, and b) the received different recovery path, wherein the first failed action and the second failed action are similar.

2. The method of claim 1, wherein the failed action is caused by one or more of the following: incomplete information, insufficient authorization, or missing additional actions.

3. The method of claim 1, further comprising executing the reconfigured action using credentials of a user.

4. The method of claim 3, further comprises granting authorization for the executing of the reconfigured action, wherein the authorization is permanent.

5. The method of claim 3, further comprises granting authorization for the executing of the reconfigured action, wherein the authorization is temporary.

6. The method of claim 5, wherein a duration of the temporary authorization is based on at least an amount of time the reconfigured action will take to complete.

7. A computer program product for reconfiguring of a requested action, the computer program product comprising one or more computer readable storage mediums having program instructions embodied therewith, the program instructions executable by one or more processors to cause the one or more processors to perform a method comprising:

determining, by one or more processors, that a requested action is a first failed action, wherein the requested action is initiated by a user of a first device, wherein the requested action is initiated by a user of a first device;

determining, by the one or more processors, that the first failed action is a valid action;

determining, by the one or more processors, that the first failed action is not properly configured;

initiating, by the one or more processors, a generation of a partially reconfigured action, wherein the partially reconfigured action includes one or both of the following: a) one or more relevant preconditions of the first failed action, and b) a relevant recovery path for the first failed action;

responsive to a determination that the generation of the partially reconfigured action of the first failed action has failed, submitting, by the one or more processors, the requested action and the partially reconfigured action to an error resolution program;

receiving, by the one or more processors, a reconfigured action from the error resolution program, wherein (i) the reconfigured action includes one or both of the following: a) a different one or more preconditions than the partially reconfigured action, and b) a different recovery path than the partially reconfigured action; and (ii) the reconfigured action is generated based, at least in part, on one or more results from a search of at least one remote database;

executing, by the one or more processors, the reconfigured action, wherein the reconfigured action is executed when the user is currently not utilizing the first device;

in response to a determination that the user is utilizing a second device, sending, by the one or more processors, a message indicating the execution of the reconfigured action; and reconfiguring, by the one or more processors, a second failed action based, at least in part, on one or both of the following: a) the received different one or more preconditions, and b) the received different recovery path, wherein the first failed action and the second failed action are similar.

8. The computer program product of claim 7, wherein the failed action is caused by one or more of the following: incomplete information, insufficient authorization, or missing additional actions.

9. The computer program product of claim 7, the method further comprising executing the reconfigured action using credentials of a user.

10. The computer program product of claim 9, the method further comprising granting authorization for the executing of the reconfigured action, wherein the authorization is permanent.

11. The computer program product of claim 9, the method further comprising granting authorization for the executing of the reconfigured action, wherein the authorization is temporary.

12. The computer program product of claim 11, wherein a duration of the temporary authorization is based on at least an amount of time the reconfigured action will take to complete.

13. A system for reconfiguring a requested action comprising:

one or more computer-readable mediums; and one or more processors in communication with the one or more computer readable storage mediums, wherein the system is configured to perform a method, said method comprising:

determining, by one or more processors, that a requested action is a first failed action, wherein the requested action is initiated by a user of a first device;

determining, by the one or more processors, that the first failed action is a valid action;

determining, by the one or more processors, that the first failed action is not properly configured;

initiating, by the one or more processors, a generation of a partially reconfigured action, wherein the partially reconfigured action includes one or both of the following: a) one or more relevant preconditions of the first failed action, and b) a relevant recovery path for the first failed action;

responsive to a determination that the generation of the partially reconfigured action of the first failed action has failed, submitting, by the one or more processors, the requested action and the partially reconfigured action to an error resolution program;

receiving, by the one or more processors, a reconfigured action from the error resolution program, wherein (i) the reconfigured action includes one or both of the following: a) a different one or more preconditions than the partially reconfigured action, and b) a different recovery path than the partially reconfigured action; and (ii) the reconfigured action is generated based, at least in part, on one or more results from a search of at least one remote database;

executing, by the one or more processors, the reconfigured action, wherein the reconfigured action is executed when the user is currently not utilizing the first device;

in response to a determination that the user is utilizing a second device, sending, by the one or more processors, a message indicating the execution of the reconfigured action; and reconfiguring, by the one or more processors, a second failed action based, at least in part, on one or both of the following: a) the received different one or more preconditions, and b) the received different recovery path, wherein the first failed action and the second failed action are similar.

14. The computer program product of claim 13, wherein the failed action is caused by one or more of the following: incomplete information, insufficient authorization, or missing additional actions.

15. The computer program product of claim 13, the method further comprising executing the reconfigured action using credentials of a user.

16. The computer program product of claim 15, the method further comprising granting authorization for the executing of the reconfigured action, wherein the authorization is permanent.

17. The computer program product of claim 15, the method further comprising granting authorization for the executing of the reconfigured action, wherein the authorization is temporary.

18. The computer program product of claim 17, wherein a duration of the temporary authorization is based on at least an amount of time the reconfigured action will take to complete.

\* \* \* \* \*